(12) United States Patent
Janakiraman et al.

(10) Patent No.: US 11,087,139 B2
(45) Date of Patent: *Aug. 10, 2021

(54) SYSTEMS AND METHODS FOR CREATING A STORY BOARD WITH FORENSIC VIDEO ANALYSIS ON A VIDEO REPOSITORY

(71) Applicant: Honeywell International Inc., Morris Plains, NJ (US)

(72) Inventors: Kirupakar Janakiraman, Madural (IN); Naga Sundar KandhaMunisamy, Mandurai (IN); Rajesh Kulandaivel Sankarapandian, Mandurai (IN); Ramesh Arumaikani, Tirunelveli (IN); Keyurbhai Patel, Bangalore (IN); Baskaran Muthusamy, Karaikudi (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 32 days.

This patent is subject to a terminal disclaimer.

(21) Appl. No.: 16/417,328

(22) Filed: May 20, 2019

(65) Prior Publication Data

US 2019/0294885 A1 Sep. 26, 2019

Related U.S. Application Data

(63) Continuation of application No. 15/463,208, filed on Mar. 20, 2017, now Pat. No. 10,311,305.

(51) Int. Cl.
*G06K 9/00* (2006.01)
*G11B 27/10* (2006.01)

(52) U.S. Cl.
CPC ..... *G06K 9/00751* (2013.01); *G06K 9/00677* (2013.01); *G06K 9/00771* (2013.01);
(Continued)

(58) Field of Classification Search
None
See application file for complete search history.

(56) References Cited

U.S. PATENT DOCUMENTS 7,996,771 B2   8/2011  Girgensohn et al.
8,457,354 B1 * 6/2013  Kolar ................. G06K 9/00677
                                                     382/103
(Continued)

FOREIGN PATENT DOCUMENTS

CN          103733196 A     4/2014

OTHER PUBLICATIONS

English-language translation of CN patent publication 103733196A, dated Apr. 16, 2014.
(Continued)

*Primary Examiner* — Delomia L Gilliard
(74) *Attorney, Agent, or Firm* — Seager, Tufte & Wickhem, LLP

(57) ABSTRACT

Systems and methods for creating a story board with forensic video analysis on a video repository are provided. Some methods can include storing a plurality of video data streams in a data repository, storing asynchronous streams of metadata of each of the plurality of video data streams in the data repository, identifying a first object captured by at least one of the plurality of video data streams, using the asynchronous streams of metadata to identify correlations or interactions between the first object and a plurality of other objects over time, and replicating a story of the first object.

20 Claims, 5 Drawing Sheets

(52) U.S. Cl.
CPC .......... *G11B 27/10* (2013.01); *G06K 2209/21* (2013.01); *G06K 2209/27* (2013.01)

(56) References Cited

U.S. PATENT DOCUMENTS

| | | | |
|---|---|---|---|
| 9,087,386 | B2 | 7/2015 | Morris et al. |
| 9,247,211 | B2 | 1/2016 | Zhang et al. |
| 9,286,777 | B2 | 3/2016 | Vallone et al. |
| 9,576,003 | B2 | 2/2017 | McGrew et al. |
| 2001/0049826 | A1 | 12/2001 | Wilf |
| 2007/0098303 | A1 | 5/2007 | Gallagher et al. |
| 2007/0132767 | A1* | 6/2007 | Wright ............... G06K 9/00771 345/475 |
| 2010/0235535 | A1 | 9/2010 | Zhu |
| 2010/0287161 | A1 | 11/2010 | Naqvi |
| 2010/0296742 | A1 | 11/2010 | Chandrasekaran et al. |
| 2012/0062732 | A1 | 3/2012 | Marman et al. |
| 2013/0039634 | A1 | 2/2013 | M |
| 2013/0091432 | A1 | 4/2013 | Shet et al. |
| 2013/0226758 | A1 | 8/2013 | Reitan |
| 2013/0229433 | A1 | 9/2013 | Reitan |
| 2013/0321647 | A1 | 12/2013 | Khawand et al. |
| 2013/0332545 | A1 | 12/2013 | Primus et al. |
| 2014/0067875 | A1 | 3/2014 | Martinez et al. |
| 2014/0071287 | A1 | 3/2014 | Tu et al. |
| 2015/0113018 | A1 | 4/2015 | Steed et al. |
| 2015/0181164 | A1 | 7/2015 | Yang et al. |
| 2015/0248710 | A1 | 9/2015 | Medvedovsky et al. |
| 2015/0312190 | A1 | 10/2015 | Rankin et al. |
| 2016/0155063 | A1 | 6/2016 | Rich |
| 2016/0203386 | A1* | 7/2016 | Porecki ................. G06T 11/60 382/159 |
| 2016/0350901 | A1 | 12/2016 | Shuster et al. |
| 2018/0012630 | A1 | 1/2018 | Thomee et al. |

OTHER PUBLICATIONS

Scientific Working Group on Digital Evidence-Best Practices for Computer Forensics, Version 2.1, Jul. 2006.
Scientific Working Group Imaging Technology, Section 7—Best Practices for Forensic Video Analysis, Version 1.0, Jan. 16, 2009.
Extended European Search Report, EP 18155934.5, pp. 17, Aug. 27, 2018.

* cited by examiner

Incident Detail Report

Summary:

Incident ID: 5
Incident Type: Abandoned object
Priority: Urgent
Location: /Facility/Terminal7
Age: 0d 1h 35m 6s

Incident Life Cycle:

David started responding incident on 12/16/2015 12:58:38 AM
David closed incident on 12/16/2015 1:07:17 AM

Comments:

.\administrator 12/15/2015 11:35:31 PM
Abandoned object has been identified at terminal 7 by the patrolling guard

| Step Details | Time Stamp |
|---|---|
| 1 Initialize forensic manager to identify the object location <br> Comment: Initialized the forensic manager to identify the object | David 12/16/2015 <br> 12:58:43 AM |
| 2 Pass video and metadata information to forensic analysis module <br> Comment: The video meta data identified for a period of time is sent to Forensic analysis module | David 12/16/2015 <br> 1:00:23 AM |
| 3 Feed each video recording to Object classification module and object relationship builder <br> Comment: The object relationship builder has generated the result | David 12/16/2015 <br> 1:01:33 AM |
| 4 Produce the identified objects from the object classification module <br> Comment: Object classification and identification module has generated the list of identified object | David 12/16/2015 <br> 1:02:15 AM |

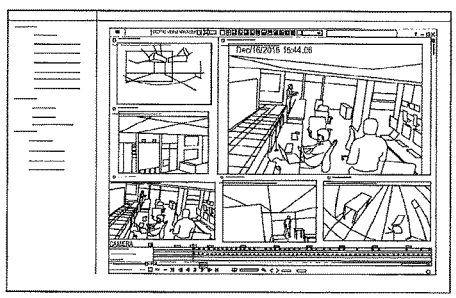

5 Store analysis results for further analysis into object

*FIG. 2A*

Incident Detail Report identification and classification module
　　Comment: Store the object classification result for future analysis　　David 12/16/2015 1:02:42 AM

6 Identify Associated persons and track their activity using the forensic video analytic engine
　　Comment: Identified the associated persons at CAM-77　　David 12/16/2015 1:03:55 AM

7 Identify associated objects and tag them
　　Comment: Associated objects are identified and tagged their types using object classification module　　David 12/16/2015 1:04:33 AM

8 The incident and attach the story
　　Comment: Attached are the abandoned object incident story which the Forensic manager has generated　　David 12/16/2015 1:07:11 AM

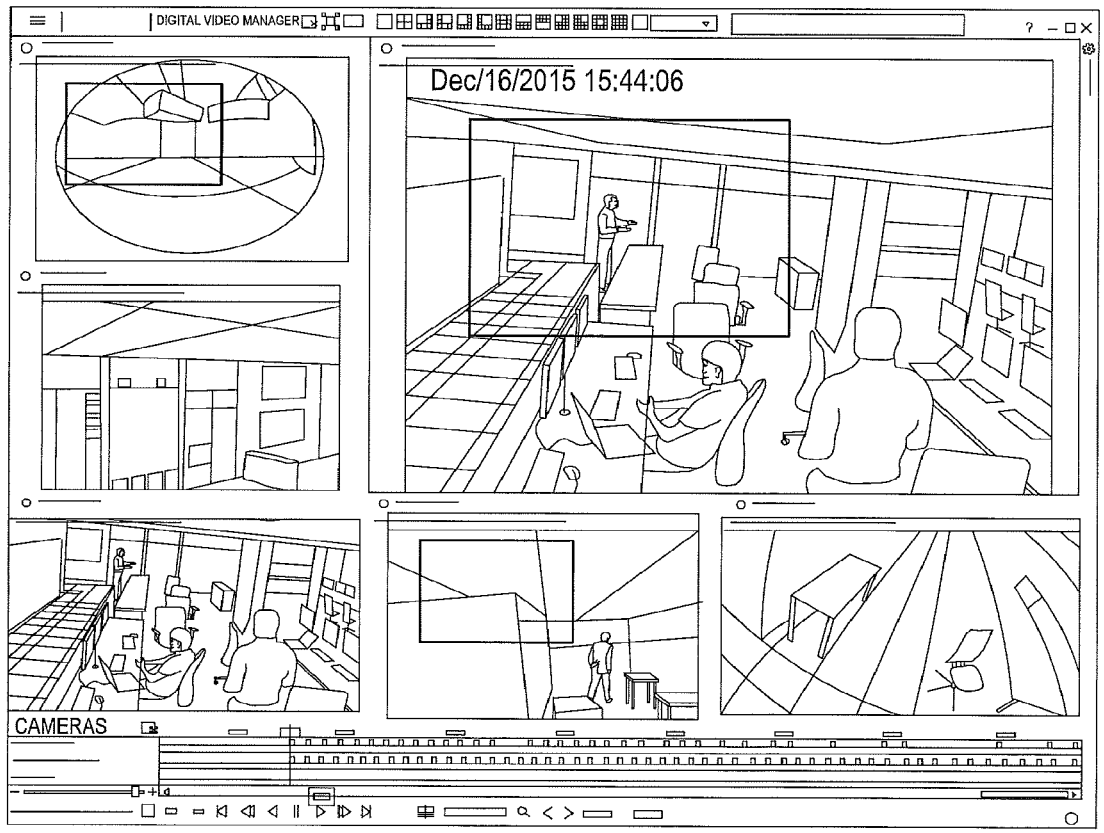

FIG. 2B

SYSTEMS AND METHODS FOR CREATING A STORY BOARD WITH FORENSIC VIDEO ANALYSIS ON A VIDEO REPOSITORY

This application is a continuation of U.S. application Ser. No. 15/463,208, filed Mar. 20, 2017, entitled, "SYSTEMS AND METHODS FOR CREATING A STORY BOARD WITH FORENSIC VIDEO REPOSITORY", which is hereby incorporated by reference.

FIELD

The present invention relates generally to forensic video analysis. More particularly, the present invention relates to systems and methods for creating a story board with forensic video analysis on a video repository.

BACKGROUND

Forensic video analysis (FVA) is an investigative, post-event forensic science, and the International Association for Identification (IAI) has formally recognized FVA as a sub-specialty within the scientific discipline of forensic imaging. Specifically, FVA is the scientific examination, comparison, and evaluation of video in legal matters. That is, FVA is the application of image science and domain expertise to interpret the content of an image or the image itself in legal matters. Disciplines of FVA with law enforcement applications include photogrammetry, photographic comparison, content analysis, and image authentication. For example, a forensic analyst may want to identify information regarding the interaction of people and objects in an easy and accurate manner and may want a detailed incident management report with artifacts supporting the same for producing in a court of law. Similarly, a legal person may want to view sufficient and untampered artifacts to articulate an incident in detail, including the people and objects involved in the incident.

The Scientific Working Group on Imaging Technology (SWGIT) sets standards for FVA and identifies the following tasks for the process of FVA: technical preparation, examination, and interpretation. During the interpretation process, specific subject matter expertise is applied to draw conclusions about video recordings or the content of those recordings. For example, drawing a conclusion about a video recording can include authenticating the video recording. Drawing a conclusion about the content of a video recording can include comparing objects or determining that an object appears different in the video than the object appears under normal lighting conditions due to the properties of the recording process, such as an infrared (IR) negative image effect on natural fibers.

Any incident management report that the interpretation process generates must comply with the SWGIT standards, meet the requirements of an analyst's agency, address a requestor's needs, and provide all relevant information in a clear and concise manner. However, there are currently no known systems or methods to perform FVA on a video repository of raw video data, as per the SWGIT standards, for example, to back track a person or object to create a story board of various incidents involving that person or object or an associated person or object. Furthermore, there are currently no known systems or methods to perform an investigation on multiple associated persons, including tracking objects associated with such persons and interactions between such persons and objects, or to create a story board of such persons and objects. This is because known systems and methods to interpret video and to generate incident management reports are manual and align with video data, not metadata.

Notwithstanding the above, known video systems generate thousands of video data streams per day, and one or more of those video data streams may contain representations of people or objects relevant to suspicious activities. However, most such video data streams exist only as data until they are overridden or flushed, not translated into metadata that can be a valuable data node for future FVA.

In view of the above, there is a continuing, ongoing need for improved systems and methods.

BRIEF DESCRIPTION OF THE DRAWINGS

FIG. 2A is a first portion of an exemplary incident management report that can be generated in accordance with disclosed embodiments;

FIG. 2B is a second portion of an exemplary incident management report that can generated in accordance with disclosed embodiments;

DETAILED DESCRIPTION

Figure 1:
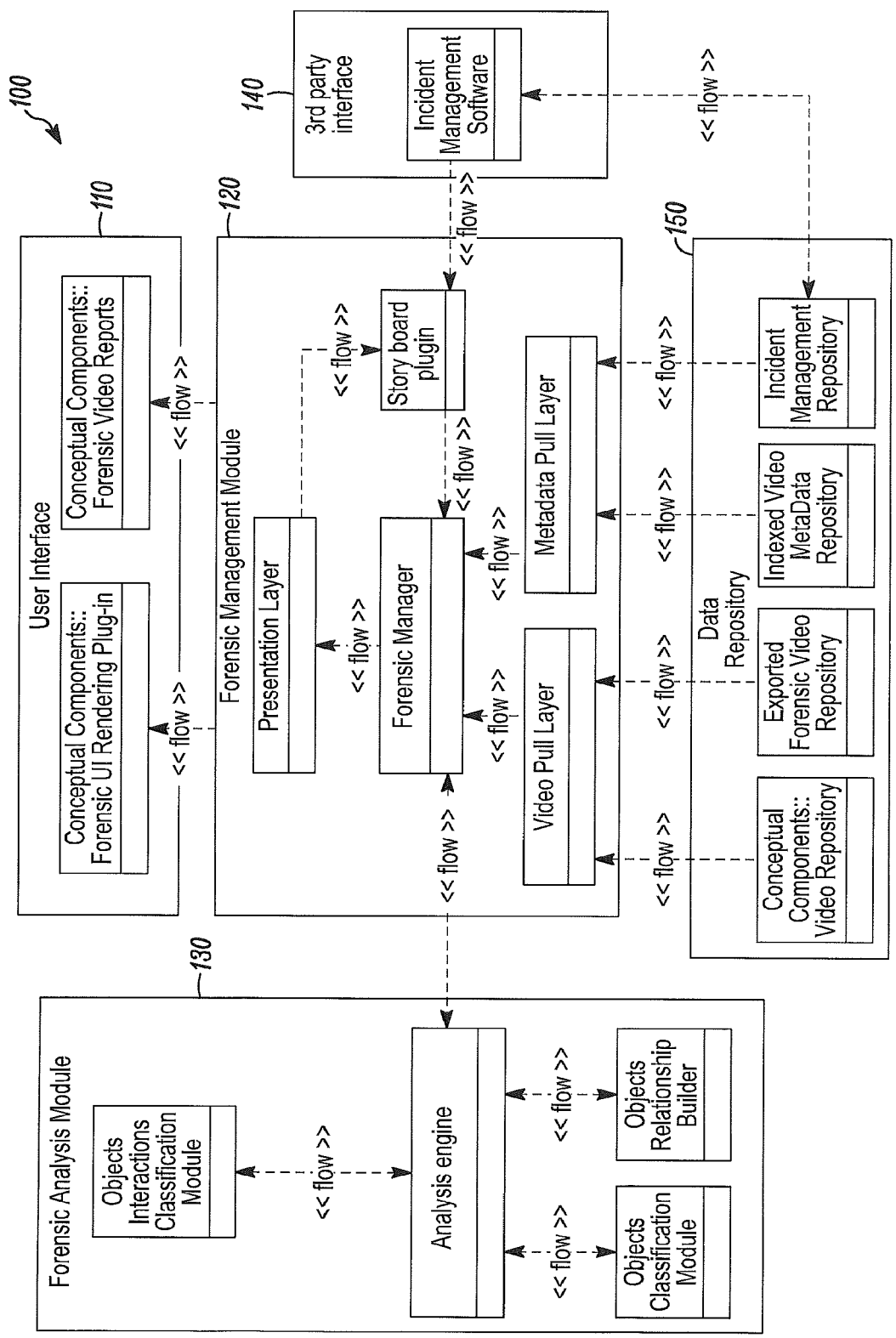
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for creating a story board with FVA on a video repository. It is to be understood that systems and methods disclosed herein can execute FVA offline. That is, in some embodiments, the FVA as disclosed and described herein can be executed on a stream of metadata, for example, when an original video data stream is unavailable.

In accordance with disclosed embodiments, video data streams or video clips that are generated by video surveillance cameras and/or stored on video management servers or storage servers in video management systems can be encapsulated with a proprietary data structure, including a proprietary file header. Accordingly, systems and methods disclosed herein can decapsulate the proprietary file header from a video data stream and execute a rapid analysis over the video data of the video data stream to convert the video data into a stream of asynchronous metadata. Then, the metadata can be stored in an atomic state in a forensic metadata repository, and information can be autonomously extracted from the metadata and converted into an incident management report.

As explained above, the process of interpretation in FVA includes applying specific subject matter expertise to draw conclusions about video data streams or video clips or the content of those video data streams or video clips. Such conclusions can include identifying various correlations and interactions, for example, between persons and/or objects depicted in the video data streams or the video clips over time. In some embodiments, systems and methods disclosed herein can autonomously identify such correlations from stored metadata to replicate the story of an incident or the workflow of an event, to identify interactions at locations of interest or information about areas of interest, to identify the time and the state of conditions during incidents, or to track persons or objects in metadata.

FIG. 1 is a block diagram of a system 100 in accordance with disclosed embodiments. As seen in FIG. 1, the system 100 can include a user interface 110, a forensic management module 120, a forensic analysis module 130, a third party interface 140, and a data repository 150.

The user interface 110 can include an incident management tool interface and an intelligent video management system (IVMS) client interface. In some embodiments, the incident management tool interface can act as a plug in to existing architecture and can receive and transmit additional parameters to the existing architecture that can be used to fabricate incident management reports. For example, the incident management tool interface can act as a centralized interface for calibrating the additional parameters, and the supplied additional parameters can cause the existing architecture to embed metadata associated with an incident in an incident management report, including embedding metadata in video data in an incident management report. In some embodiments, the IVMS client interface can receive and transmit instructions to configure the forensic analysis module 130, to manage incidents, and to trigger storyboard reporting.

The forensic management module 120 can include components and adapters for pulling video data and audio data from the data repository 150, for decoding and decompressing raw data, for managing a metadata schema, for normalizing metadata in a metadata database, for providing a storyboard interface, for managing objects in the user interface 110, and for managing plug ins for the forensic analysis module 130.

The forensic analysis module 130 can act as an analytical plug in engine to existing architecture and can classify persons and objects, detect, identify, and track persons and objects, and process images to assist the forensic management module 120 in extracting metadata from raw video data. In some embodiments, the forensic analysis module 130 can identify relationships between objects and persons and/or can identify a relationship schema. In either embodiment, identified relationships or an identified relationship schema can be input to a relationship builder.

The third party interface 140 can integrate the incident management tool interface of the user interface 110 and other components of the system 100 with the forensic management module 120. For example, the third party interface can include a plurality of adapters for integrating third parties with events that require notification.

Finally, the data repository 150 can store the data and the metadata of raw video data, indexed metadata of various incidents, persons, and objects, incident management data and workflow metadata, and system states and associated framework metrics. In some embodiments, the data repository 150 can be only accessible via the forensic management module 120 to maintain security, and in some embodiments, encapsulated data can only be decapsulated by users with authenticated credentials. In some embodiments, the video data in the data repository 150 can be normalized to a common form for a plurality of users, vendors, or integrators, but can be specific to a user, vendor, or integrator so that the video data can only be decoded with an adaptor specific to the particular user, vendor, or integrator. Furthermore, in some embodiments, databases in the data repository 150 can use a dynamic schema that can evolve at runtime. For example, in some embodiments, runtimes can be scheduled at periodic intervals, and data can be translated as per the dynamic schema or rule that is adapted per the runtime requirements of a particular scheduled runtime.

In accordance with the above and below described embodiments, systems and methods disclosed herein can passively analyze multiple video data streams or video clips asynchronously to identify, locate, and track objects and to refine metadata associated with the objects for further forensic analysis. For example, the user interface 110 can receive user input identifying a primary or initial person or object.

In accordance with the above and below described embodiments, systems and methods disclosed herein can decapsulate and decode video data and translate raw video data into image streams, metadata, and configuration parameters that can be analyzed to identify navigation patterns of a person or object and to identify related persons or objects. For example, existing video data in the data repository 150 can be converted into streams of optimized metadata, and the forensic analysis module 130 can execute asynchronous threads of analysis over such data to search for and identify the primary or initial person or object, can build an initial schema with mappings and associations to the primary or initial person or object, can build metadata of the primary or initial person or object based on the analysis over the data in the data repository 150, can mark possible interactions of the primary or initial person or object with secondary persons or objects as well as associated metadata, can create a dynamic schema based on such interactions, can refine associations between the primary or initial person or object and the secondary persons or objects, can evolve metadata in the data repository 150 with marking information for the primary or initial person or object, the secondary persons or objections, and the interactions therebetween, and can define persons or objects of interest and locations or zones of interest based on the dynamic schema. In some embodiments, evolving the metadata in the data repository 150 can include building correlation rules that can be used by the user interface 110 to generate incident management reports as disclosed and described herein so that such reports can include all relevant information that has been associated with a person or object of interest.

In some embodiments, the defined persons and objects of interest and locations or zones of interest can be stored in the data repository 150 and be marked and plotted on a monitor of the user interface 110 or be included in incident management reports that can be generated on top of the metadata. For example, FIG. 2A and FIG. 2B are exemplary incident management reports that can be generated in accordance with disclosed embodiments. As seen, the reports can be generated based on the forensic analysis as disclosed and described herein and can include metadata and video footage, an identification of persons or objects of interest and locations or zones of interest, information related to areas, zones, or facilities, and snapshots of events of interest.

Figure 3:
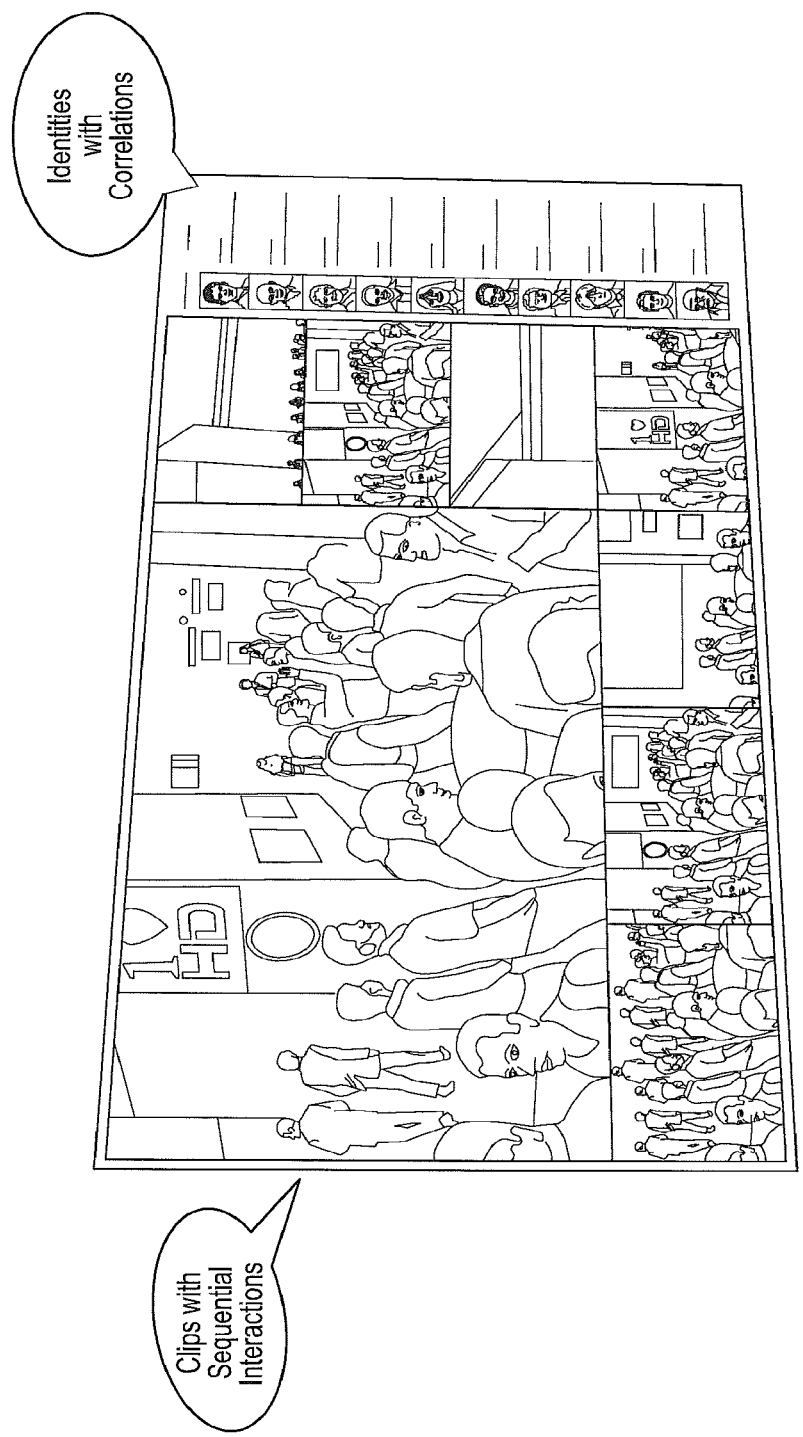
FIG. 3 is an exemplary storyboard that can be generated in accordance with disclosed embodiments.

Furthermore, in some embodiments, a generated incident management report and the metadata used to generate the same can be translated into a storyboard that can include a set of footages and correlated events that can be displayed on a monitor of the user interface 150 as seen in FIG. 3. For example, the storyboard shown in FIG. 3 can display persons or objects of interest in a demultiplexed manner by rearranging the order of video data streams from surveillance cameras to present an intelligent, for example, logical or chronological, view of the order of events of interest. In some embodiments, systems and methods disclosed herein can stream metadata to the user interface 150 for displaying the same on the storyboard.

In some embodiments, systems and methods disclosed herein can generate a walk through report for a floor plan that can include the history of persons or objects of interest navigating the respective region as well as occupancy details for the same, for example, the number of employees, security guards, or visitors in an identified region. In some embodiments, systems and methods disclosed herein can collect occupancy details and the like from other subsystems as would be known by those of skill in the art.

Figure 4:
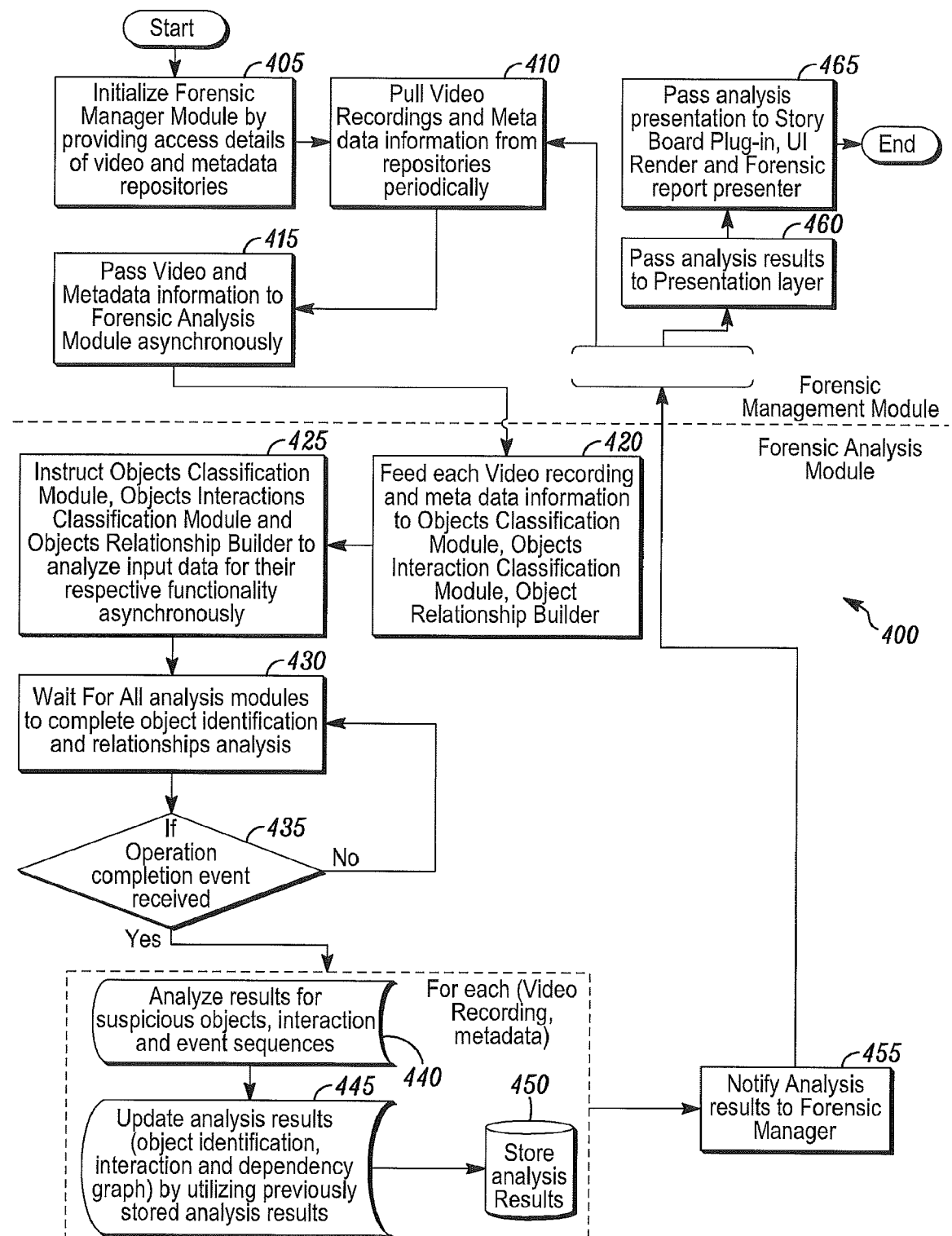
FIG. 4 is a flow diagram of a method in accordance with disclosed embodiments.

FIG. 4 is a flow diagram of a method 400 in accordance with disclosed embodiments. As seen in FIG. 4, the method 400 can include providing access details or credentials for video and metadata repositories in the data repository 150 as in 405 to, for example, initialize the forensic management module 120. Then, the method 400 can include periodically pulling video recordings and metadata information from the video and metadata repositories as in 410 and asynchronously passing the video and metadata information to the forensic analysis module 130 as in 415.

After the forensic module 130 receives the video and metadata information, the method 400 can include feeding each video recording and metadata information to an objects classification module, an objects interaction classification module, and an objects relationship builder as in 420 and instructing the objects classification module, the objects interactions classification module, and the objects relationship builder to asynchronously analyze input data as in 425 to classify objects, to classify object interactions, and to build object relationships. The method 400 can include waiting for the objects classification module, the objects interactions classification module, and the objects relationship builder to complete their object identification and relationship analysis as in 430 and determining whether an operation completion event has been received as in 435.

When the method determines that an operation completion event has been received as in 435, the method 400 can include, for each video recording and metadata information, analyzing the results from the objects classification module, the objects interactions classification module, and the objects relationship builder for suspicious objects, interactions, and event sequences as in 440 and updating the analysis results, including any object identification, interaction, and dependency graphs, as in 445 by utilizing previously stored analysis results in a stored analysis results database 450.

The method 400 can include notifying the forensics management module 120 of the analysis results as in 455, and, after the forensics management module 120 receives the analysis results, the method 400 can include continuing to periodically pull video recordings and metadata information from the video and metadata repositories as in 410, passing the analysis results to a presentation layer as in 460, and passing a presentation of the analysis results to a storyboard plug in, a user interface renderer, or a forensic report presenter as in 465 for generation and presentation of the same.

It is to be understood that the systems and methods as disclosed and described above, can be implemented with a transceiver device for communicating with a plurality of surveillance cameras or servers and a memory device for storing video data streams and metadata, each of which can be in communication with control circuitry, one or more programmable processors, and executable control software as would be understood by one of ordinary skill in the art.

In some embodiments, the executable control software can be stored on a transitory or non-transitory computer readable medium, including, but not limited to, local computer memory, RAM, optical storage media, magnetic storage media, flash memory, and the like, and some or all of the control circuitry, the programmable processors, and the control software can execute and control at least some of the methods described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   storing in a data repository a plurality of video data streams each capturing video of a corresponding monitored region;
   storing streams of metadata of each of the plurality of video data streams in the data repository;
   receiving a user input via a user interface identifying an initial person and/or initial object;
   identifying the initial person and/or initial object in the monitored region of at least one of the plurality of video data streams;
   using the streams of metadata to identify one or more correlations and/or interactions between the initial person and/or initial object and one or more other persons and/or other objects in at least one of the plurality of video data streams;
   using the identified correlations and/or interactions between the initial person and/or initial object and one or more other persons and/or other objects to replicate a story of an incident; and;
   wherein replicating the story of the incident includes generating a storyboard using the respective streams of metadata of each of the plurality of video data streams, and wherein the storyboard summarizes the correlations and/or the interactions between the initial person and/or initial object and one or more other persons and/or other objects; and
   wherein the storyboard orders the plurality of video data streams to present a logical or chronological view of the story of the initial person and/or initial object irrespective of an order of the plurality of video data streams in the data repository.

2. The method of claim 1, further comprising extracting the streams of metadata from the plurality of video data streams.

3. The method of claim 1, further comprising displaying the storyboard via the user interface.

4. The method of claim 1, wherein the user input identifies an initial person.

5. The method of claim 4 comprising identifying an interaction between the initial person and one or more other persons using the streams of metadata.

6. The method of claim 4 comprising identifying an interaction between the initial person and one or more objects using the streams of metadata.

7. The method of claim 4 comprising identifying a correlation between the initial person and one or more other persons and/or other objects using the streams of metadata.

8. The method of claim 1, wherein the user input identifies an initial object.

9. The method of claim 8 comprising identifying an interaction between the initial object and one or more persons using the streams of metadata.

10. The method of claim 8 comprising identifying a correlation between the initial object and one or more persons using the streams of metadata.

11. A method comprising:
    storing in a data repository a plurality of video data streams each capturing video of a corresponding monitored region;
    storing metadata of each of the plurality of video data streams in the data repository;
    classifying objects captured by the plurality of video data streams;
    identifying one or more interactions of at least some of the objects based at least in part on the metadata;
    identifying one or more relationships between at least some of the objects based at least in part on the metadata; and
    presenting a story of at least one of the objects, at least one of the one or more identified interactions of the objects, and at least one of the one or more identified relationships of the objects via a user interface.

12. The method of claim 11 further comprising:
    based on the objects as classified, the one or more identified interactions of the objects, and the one or more identified relationships of the objects, identifying the at least one of the objects, at least one of the one or more identified interactions of the objects, and/or at least one of the one or more identified relationships of the objects, as suspicious; and
    presenting the story comprises identifying the at least one of the objects, at least one of the one or more identified interactions of the objects, and/or at least one of the one or more identified relationships of the objects, that are identified as suspicious.

13. The method of claim 11 wherein the objects include a person or an object in a monitored region.

14. The method of claim 11 further comprising refining the metadata stored in the data repository based on the objects as classified, the one or more identified interactions of the objects, and/or the one or more identified relationships of the objects.

15. The method of claim 11 further comprising generating an incident management report, wherein the incident management report summarizes at least some of the objects as classified, the one or more identified interactions of the objects, and/or the one or more identified relationships of the objects.

16. The method of claim 15 wherein presenting the story comprises generating and presenting a storyboard that summarizes the incident management report.

17. A method comprising:
    storing in a data repository a plurality of video data streams each capturing video of a corresponding monitored region;
    storing streams of metadata of each of the plurality of video data streams in the data repository;
    classifying objects captured by the plurality of video data streams based at least in part on the metadata;
    receiving a user input via a user interface identifying an initial person or object;
    identifying the initial person and/or initial object in at least one of the plurality of video data streams;
    identifying one or more interactions between the initial person and/or initial object and one or more other person and/or object in at least one of the plurality of video data streams based at least in part on the metadata;
    identifying one or more relationships between the initial person and/or initial object and one or more other person and/or object in at least one of the plurality of video data streams based at least in part on the metadata; and
    presenting via a user interface a story of the initial person and/or initial object that is based at least in part on one or more of the classification of the objects, the one or more identified interactions between the initial person and/or initial object and one or more other person and/or object, and the one or more identified relationships between the initial person and/or initial object and one or more other persons and/or objects.

18. The method of claim 17 further comprising refining the metadata stored in the data repository based on the objects as classified, the one or more identified interactions between the initial person and/or initial object and one or more other person and/or object, and the one or more identified relationships between the initial person and/or initial object and one or more other persons and/or objects.

19. The method of claim 17 wherein presenting the story of the initial person and/or initial object includes generating an incident management report, wherein the incident management report summarizes at least some of the one or more identified interactions between the initial person and/or initial object and one or more other person and/or object.

20. The method of claim 19, wherein the incident management report summarizes at least some of the one or more identified relationships between the initial person and/or initial object and one or more other persons and/or objects.

* * * * *